(12) United States Patent
Hong et al.

(10) Patent No.: US 8,812,044 B2
(45) Date of Patent: Aug. 19, 2014

(54) APPARATUS AND METHOD FOR CONTROLLING DATA TRANSMISSION RATE IN BROADBAND WIRELESS COMMUNICATION SYSTEM

(75) Inventors: Ki-Seob Hong, Suwon-si (KR); Byung-Chan Ahn, Seoul (KR); Seung-Joo Maeng, Seongnam-si (KR); Yun-Jik Jang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 544 days.

(21) Appl. No.: 12/624,721

(22) Filed: Nov. 24, 2009

(65) Prior Publication Data
US 2010/0130244 A1    May 27, 2010

(30) Foreign Application Priority Data
Nov. 26, 2008   (KR) ................. 10-2008-0118073

(51) Int. Cl.
*H04B 7/00*    (2006.01)
(52) U.S. Cl.
USPC .... 455/522; 455/63.1; 455/67.13; 455/552.1; 370/332
(58) Field of Classification Search
USPC .............. 455/522, 63.1, 67.11, 453, 452.1, 455/452.2, 451, 513, 67.7, 509, 464, 67.13, 455/518, 525, 550.1, 552.1, 553.1, 560, 455/561; 370/348, 347, 318, 342, 335, 370/328–332
See application file for complete search history.

(56) References Cited

U.S. PATENT DOCUMENTS

| | | | |
|---|---|---|---|
| 7,353,025 B2 * | 4/2008 | Ahn et al. ...................... | 455/434 |
| 7,565,152 B2 * | 7/2009 | Gandhi et al. ................ | 455/453 |
| 7,831,257 B2 * | 11/2010 | Pollman et al. ............... | 455/453 |
| 8,325,621 B2 * | 12/2012 | Simonsson et al. .......... | 370/252 |
| 2007/0141995 A1 * | 6/2007 | Youn et al. ....................... | 455/69 |
| 2007/0270100 A1 * | 11/2007 | Agrawal et al. ............ | 455/67.11 |
| 2008/0056220 A1 * | 3/2008 | Yu et al. ........................ | 370/342 |
| 2010/0091730 A1 * | 4/2010 | Jang et al. ..................... | 370/329 |

* cited by examiner

*Primary Examiner* — Nhan Le
(74) *Attorney, Agent, or Firm* — Jefferson IP Law, LLP (57) ABSTRACT

An apparatus and a method for controlling a data transmission rate in a broadband wireless communication system are provided. In the method, an interference factor representing an interference degree by an external sector is measured. Interference given to the external sector is estimated using the interference factor, an interference weight depending on a location of a terminal, and an amount of wireless resource use of a self sector. A data transmission rate is determined with consideration of an interference estimation value and a wireless channel state of the terminal.

20 Claims, 7 Drawing Sheets

APPARATUS AND METHOD FOR CONTROLLING DATA TRANSMISSION RATE IN BROADBAND WIRELESS COMMUNICATION SYSTEM

PRIORITY

This application claims the benefit under 35 U.S.C. §119(a) of a Korean patent application filed in the Korean Intellectual Property Office on Nov. 26, 2008 and assigned Serial No. 10-2008-0118073, the entire disclosure of which is hereby incorporated by reference.

BACKGROUND OF THE INVENTION

1. Field of the Invention

The present invention relates to an apparatus and a method for controlling a data transmission rate in a broadband wireless communication system. More particularly, the present invention relates to an apparatus and a method for controlling a data transmission rate and wireless resource assignment in a broadband wireless communication system.

2. Description of the Related Art

In a 4th Generation (4G) communication system, which is a next generation communication system, research for providing services of various Quality of Services (QoS) having a transmission rate of about 100 Mbps to a user are in active progress. More particularly, in the current 4G communication system, research for supporting a high speed service that guarantees a Broadband Wireless Access (BWA) communication system mobility and desired QoS is in active progress. A representative 4G communication system is an Institute of Electrical and Electronics Engineers (IEEE) 802.16 communication system.

The IEEE 802.16 communication system uses an Orthogonal Frequency Division Multiplexing (OFDM)/Orthogonal Frequency Division Multiple Access (OFDMA) scheme for a physical channel. The OFDM/OFDMA scheme obtains optimum transmission efficiency during high speed data transmission by performing transmission while maintaining orthogonality between a plurality of subcarriers.

In an IEEE 802.16-based broadband wireless communication system, data transmission is performed on a frame basis, and each frame is divided into a region for transmitting DownLink (DL) data and a region for transmitting UpLink (UL) data. Here, the region for transmitting the UL data includes a two dimensional arrangement of a frequency axis and a time axis, and each basic assignment unit is a slot. Each slot is assigned to only one terminal existing in one sector, and a set of slots assigned to respective terminals may be defined as a burst.

Hereinafter, a method for assigning a UL resource to a terminal in the conventional broadband wireless communication system is described.

First, a base station demodulates a received signal to extract UL transmission (Tx) power information transmitted by a terminal. In addition, the base station performs scheduling to determine priority (or service flow priority) between terminals. After that, the base station determines a UL Modulation and Coding Scheme (MCS) and an available wireless resource (the number of slots) using UL Tx power information according to the determined service flow priority. In addition, the base station transmits a resource assignment message including the determined MCS and wireless resource information to the terminal. As described above, the base station determines an MCS level and a wireless resource using the UL Tx power information received from the terminal.

Generally, when a Frequency Reuse Pattern (FRP)=1, since a UL uses the same frequency band, the Tx power (i.e., Tx signal) generated from a terminal is received by an external sector as well as a serving sector. When the amount of UL interference received from an external sector is large, reception performance of a base station (sector) deteriorates.

According to the conventional art, a base station assigns a UL resource with reference only to the Tx power information of a terminal. That is, the base station assigns a UL resource without consideration of the amount of interference on the external sector. In this case, reception performance of an external sector deteriorates and relevant QoS deteriorates. Accordingly, there is a need for an apparatus and method for controlling the amount of interference. That is, there is a need for a base station to assign a UL resource with consideration of the interference on an external sector.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for assigning a resource with consideration of interference on an external sector (or a base station) in a wireless communication system.

Another aspect of the present invention is to provide an apparatus and a method for estimating interference that may be given to an external sector using information measured by a self sector in a wireless communication system.

Still another aspect of the present invention is to provide an apparatus and a method for estimating an amount of interference given to an external sector with consideration of an interference factor by an external sector, a weight depending on a location of a terminal, and an amount of wireless resource use of a self sector in a wireless communication system.

Yet another aspect of the present invention is to provide an apparatus and a method for assigning a resource with consideration of an interference estimation value given to an external sector and a wireless channel state of a terminal in a wireless communication system.

In accordance with an aspect of the present invention, an apparatus of a base station in a wireless communication system is provided. The apparatus includes a measuring unit for measuring an interference factor representing an interference degree by an external sector, an estimation unit for estimating interference given to the external sector using the interference factor, an interference weight depending on a location of a terminal, and an amount of wireless resource use of a self sector, and a scheduler for determining a data transmission rate with consideration of an interference estimation value and a wireless channel state of the terminal.

In accordance with another aspect of the present invention, a method for assigning a resource at a base station in a wireless communication system is provided. The method includes measuring an interference factor representing an interference degree by an external sector, estimating interference given to the external sector using the interference factor, an interference weight depending on a location of a terminal, and an amount of wireless resource use of a self sector, and determining a data transmission rate with consideration of an interference estimation value and a wireless channel state of the terminal.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide an alternative for assigning a wireless resource based on an amount of interference given to an external sector in a broadband wireless communication system.

According to an exemplary embodiment of the present invention, a base station measures an interference factor representing a degree of interference caused by an external sector, and estimates an amount of interference given to the external sector with consideration of a weight depending on a location of a terminal, and an amount of wireless resource use of a self sector. In addition, the base station determines a UL data transmission rate and an amount of wireless resources (the number of slots) using an interference estimation value given to the external sector and a wireless channel state of the terminal.

The present invention is described using an Orthogonal Frequency Division Multiplexing (OFDM)/Orthogonal Frequency Division Multiple Access (OFDMA)-based broadband wireless communication system as an example, but is readily applicable to a wireless communication system based on a different access technique.

Figure 1:
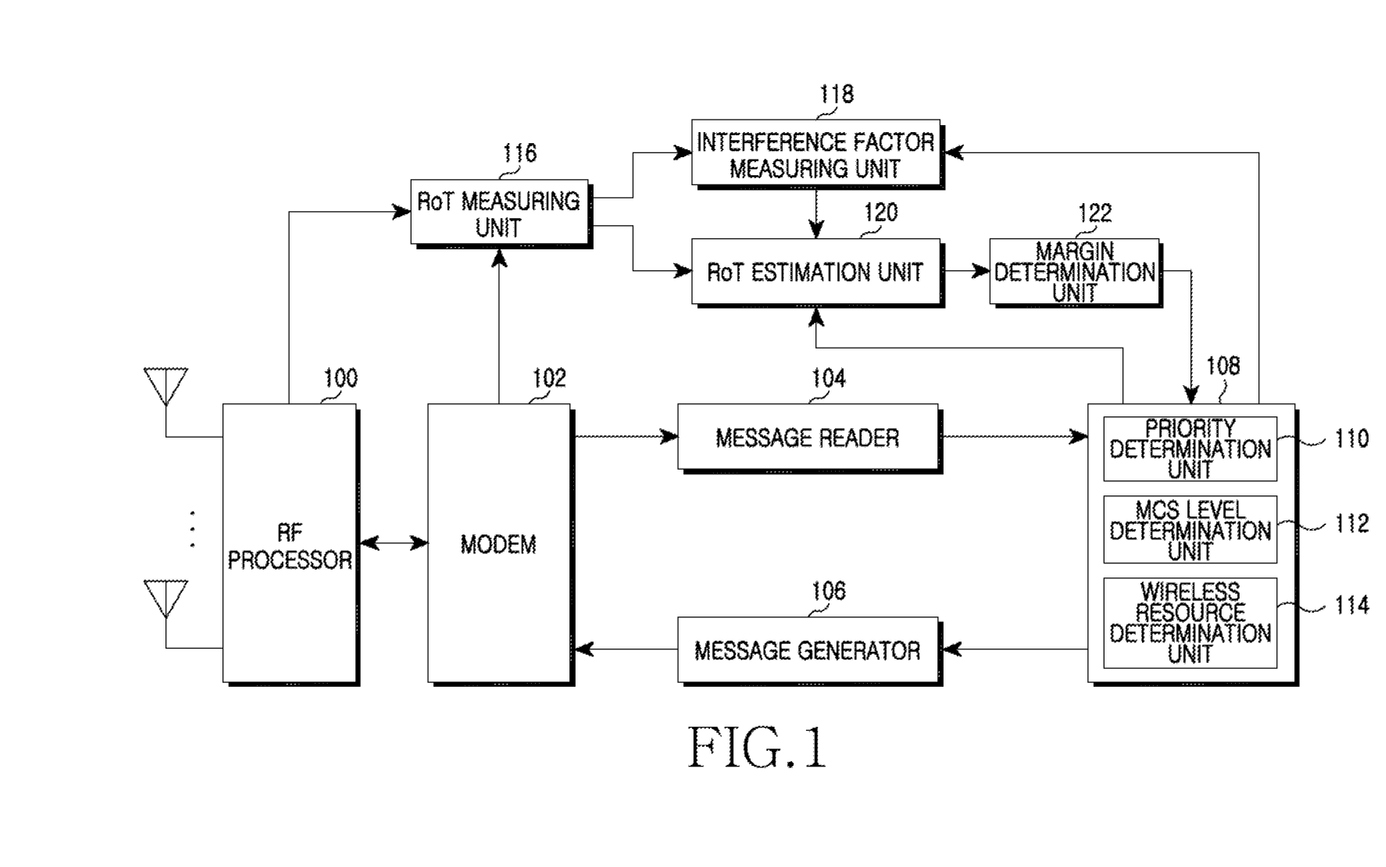
FIG. 1 is a block diagram illustrating a base station in a broadband wireless communication system according to an exemplary embodiment of the present invention.

FIG. 1 is a block diagram illustrating a base station in a broadband wireless communication system according to an exemplary embodiment of the present invention.

Referring to FIG. 1, the base station includes a Radio Frequency (RF) processor 100, a modem 102, a message reader 104, a message generator 106, a scheduler 108, a Rise over Thermal (RoT) measuring unit 116, an interference factor measuring unit 118, an RoT estimation unit 120, and a margin determination unit 122. Here, the scheduler 108 may include a priority determination unit 110, a Modulation and Coding Scheme (MCS) level determination unit 112, and a wireless resource determination unit 114.

The RF processor 100 converts a signal in an RF band received via at least one antenna into a baseband signal, converts a baseband signal into digital sample data, and provides the digital sample data to the modem 102. In addition, the RF processor 100 converts baseband sample data from the modem 102 into a baseband analog signal, converts the baseband signal into a signal in the RF band, and transmits the signal via at least one antenna. The RF processor 100 measures a Received Signal Strength Indicator (RSSI) using a reception signal.

The modem 102 recovers information data (reception packet) by demodulating a signal from the RF processor 100 in a physical layer, and provides the information data to the message reader 104. Here, in the case of an OFDM/OFDMA-based system, the modem 102 may convert sample data from the RF processor 100 into data in a frequency domain by performing OFDM demodulation (Fast Fourier Transform (FFT)), and recover original information data by performing channel demodulation and channel decoding on data in the frequency domain. In addition, the modem 102 modulates a transmission packet (a transmission message) from the message generator 106 in a physical layer and provides the modulated packet to the RF processor 100. In the case of an OFDM/OFDMA-based system, the modem 102 channel-codes and channel-modulates a transmission packet, and converts the channel-modulated data into sample data in a time domain by performing OFDM modulation (Inverse Fast Fourier Transform (IFFT)).

The message reader 104 reads a reception packet received from the modem 102, performs a relevant signaling process when the reception packet is a signaling message (e.g., a control message or Media Access Control (MAC) management message), performs a protocol process, and transfers the reception packet to an upper layer processing unit (not shown) when the reception packet contains data traffic. The message generator 106 generates a signaling message to be transmitted, transfers the generated signaling message to the modem 102, performs a protocol process on transmission traffic from the upper layer processing unit, and transfers the transmission traffic to the modem 102.

The scheduler 108 determines scheduling priority with respect to Service Flows (SFs), and determines a Modulation and Coding Scheme (MCS) level and an amount of wireless resources for each SF (or terminal) according to the determined priority. When resource assignment for terminals (or SFs) to be serviced is completed, the scheduler 108 provides a scheduling result (resource assignment result) to the message generator 106. Then, the message generator 106 generates a resource assignment message (e.g., MAP message) using the scheduling result, and provides the generated resource assignment message to the modem 102.

The RoT measuring unit 116 determines RoT using an RSSI from the RF processor 100 and Noise and Interference power (NI) information received from the modem 102. The interference factor measuring unit 118 calculates an interference factor for determining whether to assign an UpLink UL wireless resource corresponding to the RSSI measured at this time, and RoT-related information (RSSI, NI, thermal noise power (No), and the like). The RoT estimation unit 120 estimates RoT given to an external sector (or base station) using the RoT-related information, the interference factor, and resource assignment information. The margin determination unit 122 determines a UL AdaptiveTxMargin using the RoT estimation value.

The message reader 104 extracts UL Transmission (Tx) power information of a terminal from a message received from the terminal, and provides the information to the scheduler 108. In addition, the modem 102 demodulates a channel signal (for example, Channel Quality Index (CQI) channel) received from the terminal to obtain DownLink (DL) Carrier to Interference and Noise Ratio (CINR) information, and provides the obtained DL CINR information to the scheduler 108.

The priority determination unit 110 inside the scheduler 108 determines scheduling priority with respect to SFs according to a scheduling scheme. The MCS level determination unit 112 determines an MCS level with respect to each SF (or terminal) according to the determined priority. At this point, the MCS level determination unit 112 may determine the MCS level using the UL AdaptiveTxMargin, UL Tx power information received from the terminal, and DL CINR information. The wireless resource determination unit 114 determines an amount of wireless resources (the number of slots) to be serviced at the MCS level using the RoT estimation value, the UL AdaptiveTxMargin, the UL Tx power information, and the like. The above-determined MCS level and the amount of wireless resources (the number of slots) with respect to each SF are provided to the message generator 106. The message generator 106 generates a resource assignment message (MAP message) based on information provided from the scheduler 108.

Figure 2A:
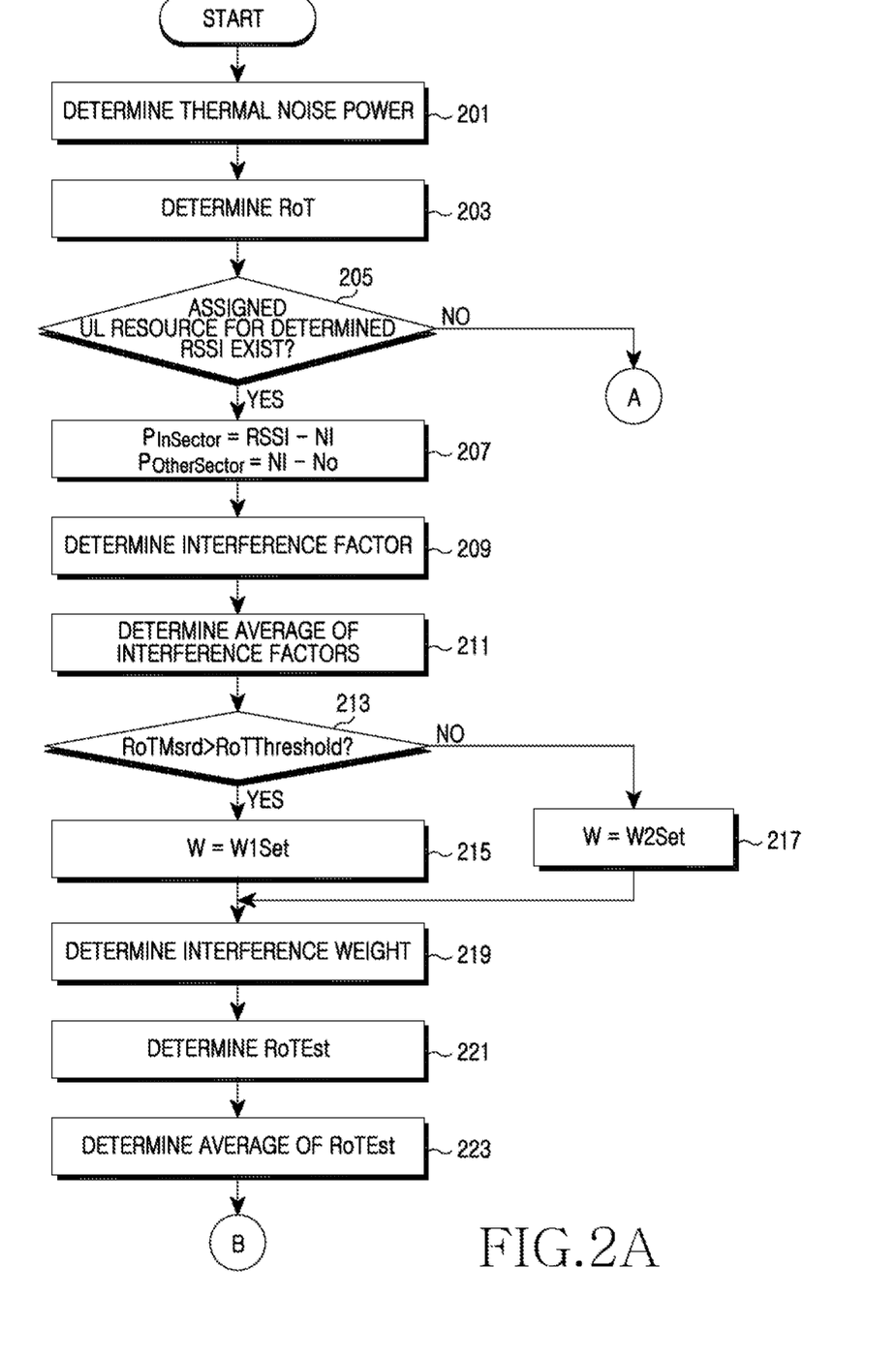
FIGS. 2A and 2B are flowcharts illustrating a procedure for assigning, at a base station, an UpLink (UL) wireless resource in a broadband wireless communication system according to an exemplary embodiment of the present invention.
Figure 2B:
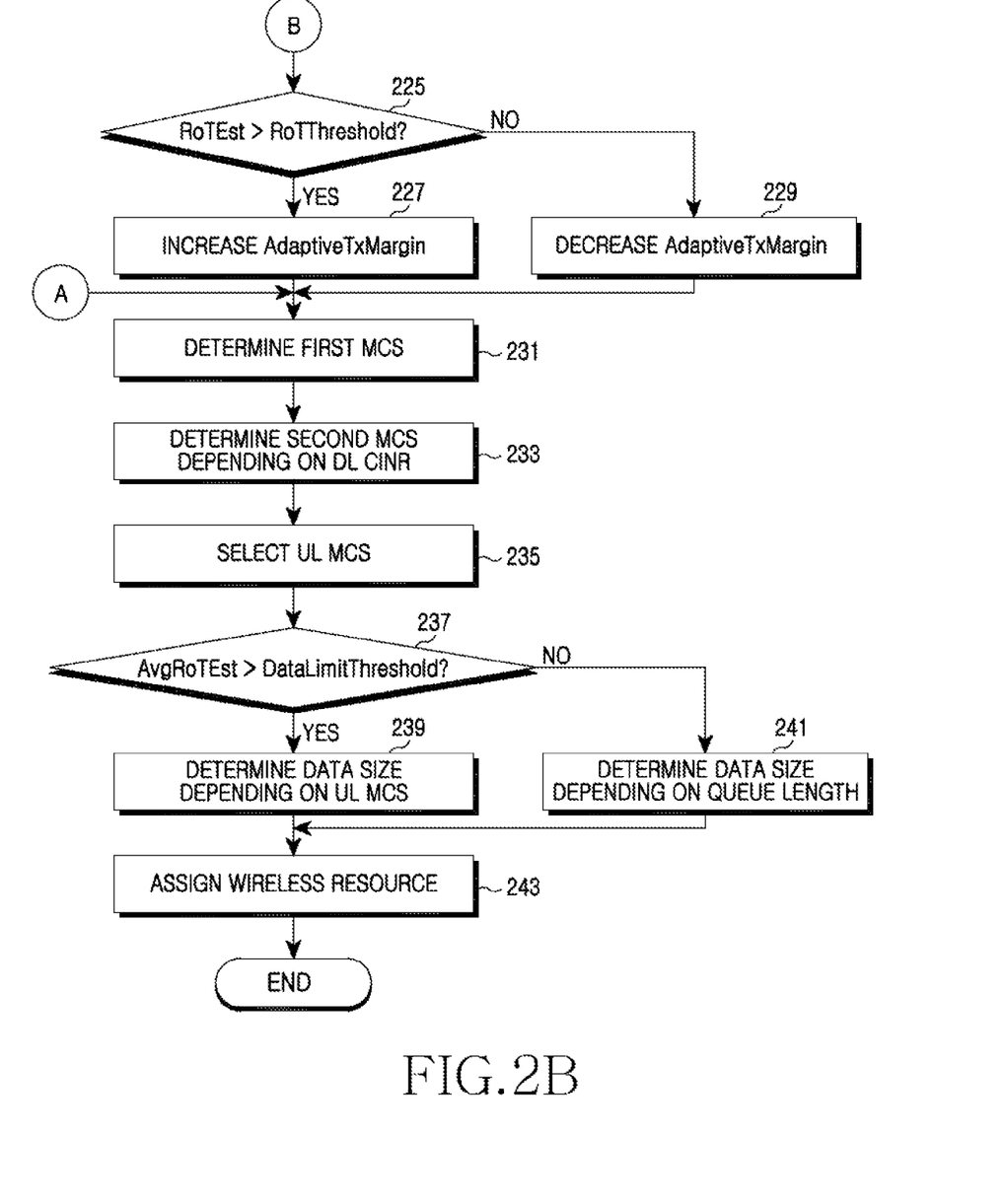

FIGS. 2A and 2B are flowcharts illustrating a procedure for assigning, at a base station, a UL wireless resource in a broadband wireless communication system according to an exemplary embodiment of the present invention.

Figure 3:
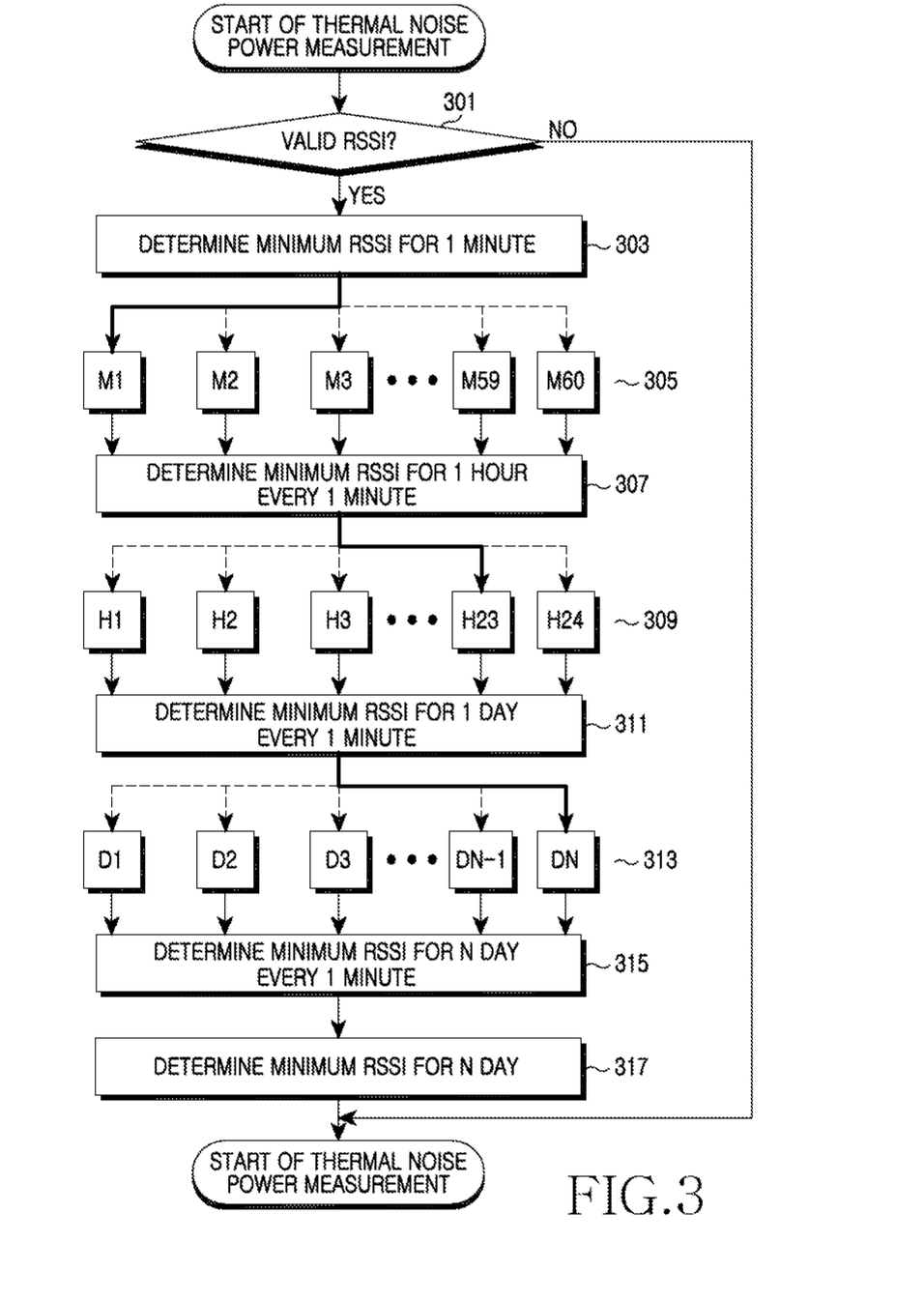
FIG. 3 is a flowchart illustrating a procedure for measuring thermal noise power in a wireless communication system according to an exemplary embodiment of the present invention.

Referring to FIGS. 2A and 2B, the base station determines thermal noise power (No) in step 201. In an exemplary implementation, the value of No may be determined as illustrated in FIG. 3, a description of which is provided below.

In step 203, the base station determines RoT using the determined value of No and the value of NI determined at the modem. For example, RoT may be determined using Equation (1).

$$RoTMsrd = \frac{NI}{No} \quad (1)$$

The base station determines whether an assigned UL resource corresponding to the RSSI measured at this time exists in step 205. That is, the base station determines whether a UL signal of a terminal exists in a signal received at this time. For example, the base station may determine whether a UL signal of the terminal exists with reference to resource assignment information (e.g., UL-MAP information) corresponding to a UL frame signal received at this time.

When an assignment resource corresponding to the measured RSSI does not exist, the base station immediately proceeds to step 231. When the assignment resource corresponding to the measured RSSI does exist, the base station determines first received power (referred to as '$P_{InSector}$') generated by a terminal using a self sector as a serving sector, and second received power (referred to as '$P_{OtherSector}$') generated by a terminal using an external sector as a serving sector in step 207. Here, the first received power and the second received power may be determined using Equation (2).

$$P_{InSector} = RSSI - NI$$

$$P_{OtherSector} = RSSI - No \quad (2)$$

The base station determines an interference factor by an external sector using the determined first received power $P_{InSector}$ and second received power $P_{OtherSector}$ in step 209. Here, the interference factor is controlled so that the interference factor is equal to or less than a threshold (e.g., max interference factor). That is, the interference factor may be determined using Equation (3).

$$InterferenceFactor = Min\left(\frac{P_{OtherSector}}{P_{InSector}}, MaxInterferenceFactor\right) \quad (3)$$

The base station determines an average of interference factors in step 211. As described above, the base station may determine an average by averaging interference factor values for a preset duration, or may use an instantaneous value as another example.

The base station compares the RoT measured value (RoTMsrd) with a predetermined threshold (RoTThreshold) in step 213. At this point, if it is determined that the RoT measured value is greater than the threshold, the base station sets weights for UL MCS levels to a first set (W1Set) in step 215. In contrast, if it is determined that the RoT measured value is equal to or less than the threshold, the base station sets weights for UL MCS levels to a second set (W2Set) in step 217. Here, W1Set and W2Set are numerical values representing a UL MCS level at which an RSSI is measured in terms of weight depending on a location of a terminal. That is, when an UL MCS level is high, the probability that a terminal is located in a region near a self sector increases, and so the probability that RoT given to an external sector is lowered increases. When the UL MCS level is low, the probability that a terminal is located at an edge region of a self sector increases, and so the probability that RoT given to an external sector rises increases. That is, weights included in W1Set and W2Set are numerical values representing an influence degree given to an external sector depending on a location of a terminal.

The base station determines interference weight using resource assignment information corresponding to the measured RSSI using Equation (4) in step 219.

$$InterferenceWeight = \frac{\sum_{MSi} W_{ULMCS,MSi} \cdot ULResource_{MSi}}{TotalSlotNumber} \quad (4)$$

In Equation (4) $W_{UL\ MCS,\ Msi}$ is a weight corresponding to an MCS level of an i-th terminal of a relevant weight set (W1Set or W2Set), $ULResource_{MSi}$ is the number of slots assigned to an i-th terminal, and TotalSlotNumber is the number of total assigned slots.

The base station estimates interference given by a UL signal corresponding to the measured RSSI to an external sector using AvgInterferenceFactor, $P_{InSector}$, InterferenceWeight, ULResourceRatio, and thermal noise power No in step 221. That is, the base station determines RoT estimation value RoTEst using Equation (5) in step 221. Here, the RoT estimation value is an interference estimation value that may be given to an external sector.

$$RoTEst = \frac{AvgInterferenceFactor \cdot P_{InSector} \cdot InterferenceWeight \cdot ULResourceRatio + No}{No} \quad (5)$$

The base station determines an average of RoT estimation values RoTEst in step 223. That is, the base station determines an average RoT estimation value by averaging RoT estimation values for a predetermined duration.

The base station compares the determined RoT estimation value with a preset threshold RoTThreshold in step 225. If it is determined that the RoT estimation value is greater than the threshold, the base station increases AdaptiveTxMargin by TxMarginUP in step 227. The base station processes the increased value so that the value does not exceed a predetermined maximum value MaxAdaptiveTxMargin. That is, the base station may determine AdaptiveTxMargin using Equation (6).

AdaptiveTxMargin=Min(AdaptiveTxMargin+TxMarginUp, MaxAdaptiveTxMargin) (6)

In contrast, if it is determined that the RoT estimation value is equal to or less than the threshold, the base station decreases AdaptiveTxMargin by TxMarginDn in step 229. The base station processes the decreased value so that the value is not less than a predetermined minimum value MinAdaptiveTxMargin. That is, the base station may determine AdaptiveTxMargin using Equation (7).

AdaptiveTxMargin=Max(AdaptiveTxMargin−TxMarginDn, MinAdaptiveTxMargin) (7)

After determining AdaptiveTxMargin, the base station determines a UL MCS level of each terminal (referred to as a first MCS level) using the determined AdaptiveTxMargin in step 231.

Figure 4:
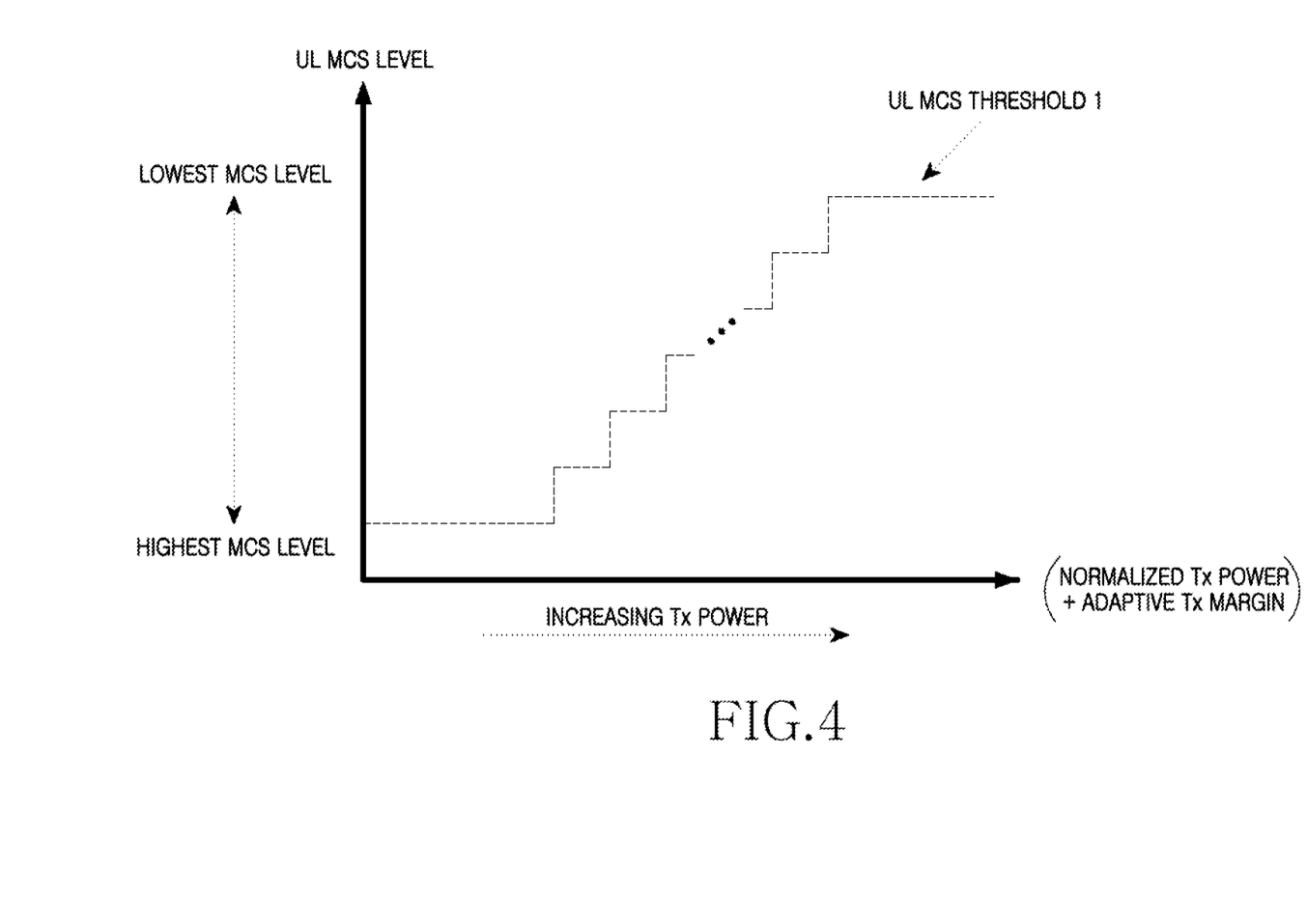
FIG. 4 is a graph illustrating a Modulation and Coding Scheme (MCS) level determining scheme depending on Transmission (Tx) power of a terminal according to an exemplary embodiment of the present invention.

FIG. 4 is a graph illustrating an MCS level determining scheme depending on Transmission (Tx) power of a terminal according to an exemplary embodiment of the present invention.

Referring to FIG. 4, the base station normalizes UL Tx power of a terminal using a specific UL MCS level (for example, Quadrature Phase Shift Keying (QPSK), ½) and a specific same wireless resource (one slot) as a reference, adds AdaptiveTxMargin to the normalized Tx power, and may determine an MCS level by comparing the added value with a preset reference value (UL MCS threshold 1).

After determining the first MCS level based on Tx power of a terminal, the base station determines a second MCS level using DL CINR of the terminal in step 233.

Figure 5:
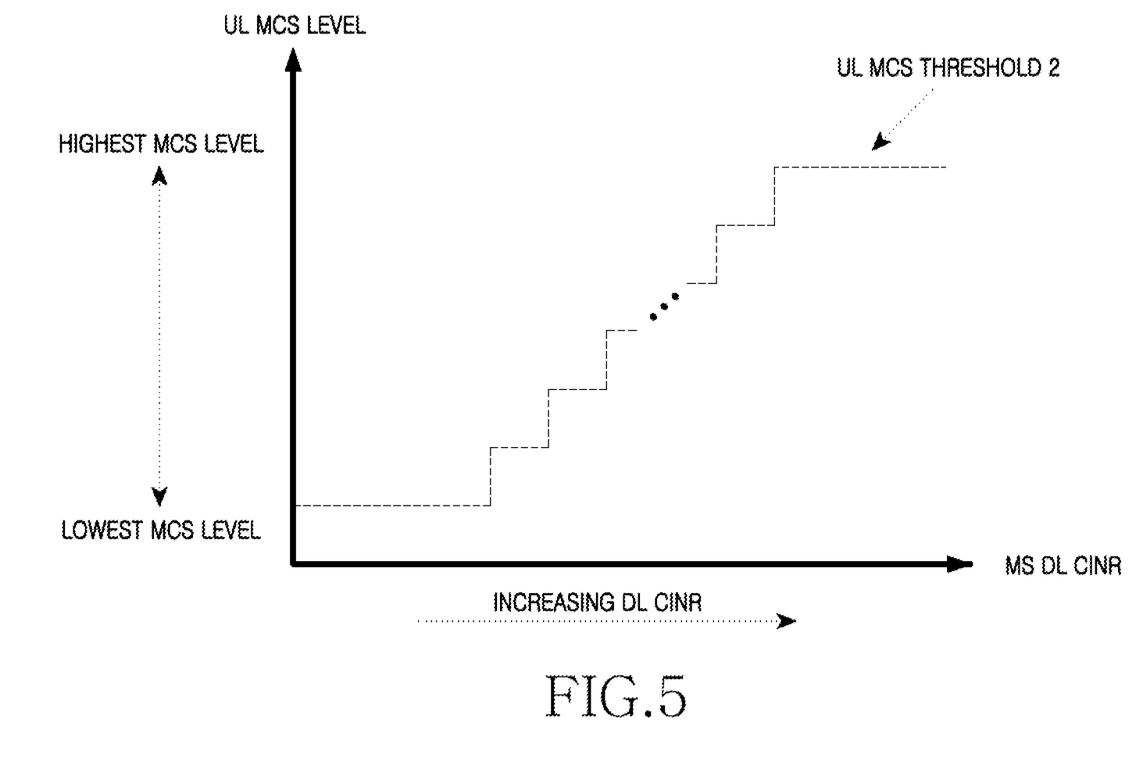
FIG. 5 is a graph illustrating an MCS level determining scheme depending on a DownLink Carrier to Interference and Noise Ratio (DL CINR) of a terminal according to an exemplary embodiment of the present invention.

FIG. 5 is a graph illustrating an MCS level determining scheme depending on a DL CINR of a terminal according to an exemplary embodiment of the present invention.

Referring to FIG. 5, the base station may determine an MCS level by comparing a DL CINR received from the terminal with a preset reference value (UL MCS Threshold 2).

As described above, after determining the first MCS level and the second MCS level, the base station determines a lower MCS level of the first MCS level and the second MCS level as a UL MCS level of the relevant terminal in step 235.

The base station compares AvgRoTEst with a preset threshold (DataLimitThreshold) in step 237. If it is determined that AvgRoTEst is greater than the threshold, the base station limits (or determines) an available data size to be assigned to each terminal to a maximum data size by a relevant UL MCS level in step 239. In contrast, if it is determined that AvgRoTEst is equal to or less than the threshold, the base station determines an available data size to be assigned to each terminal depending on a queue length (data size stacked in a queue) of the relevant terminal in step 241.

When the available data size for each terminal is determined, the base station assigns a wireless resource (the number of slots) to the terminal using an available UL Tx headroom of the relevant terminal and the available data size in step 243.

Figure 6:
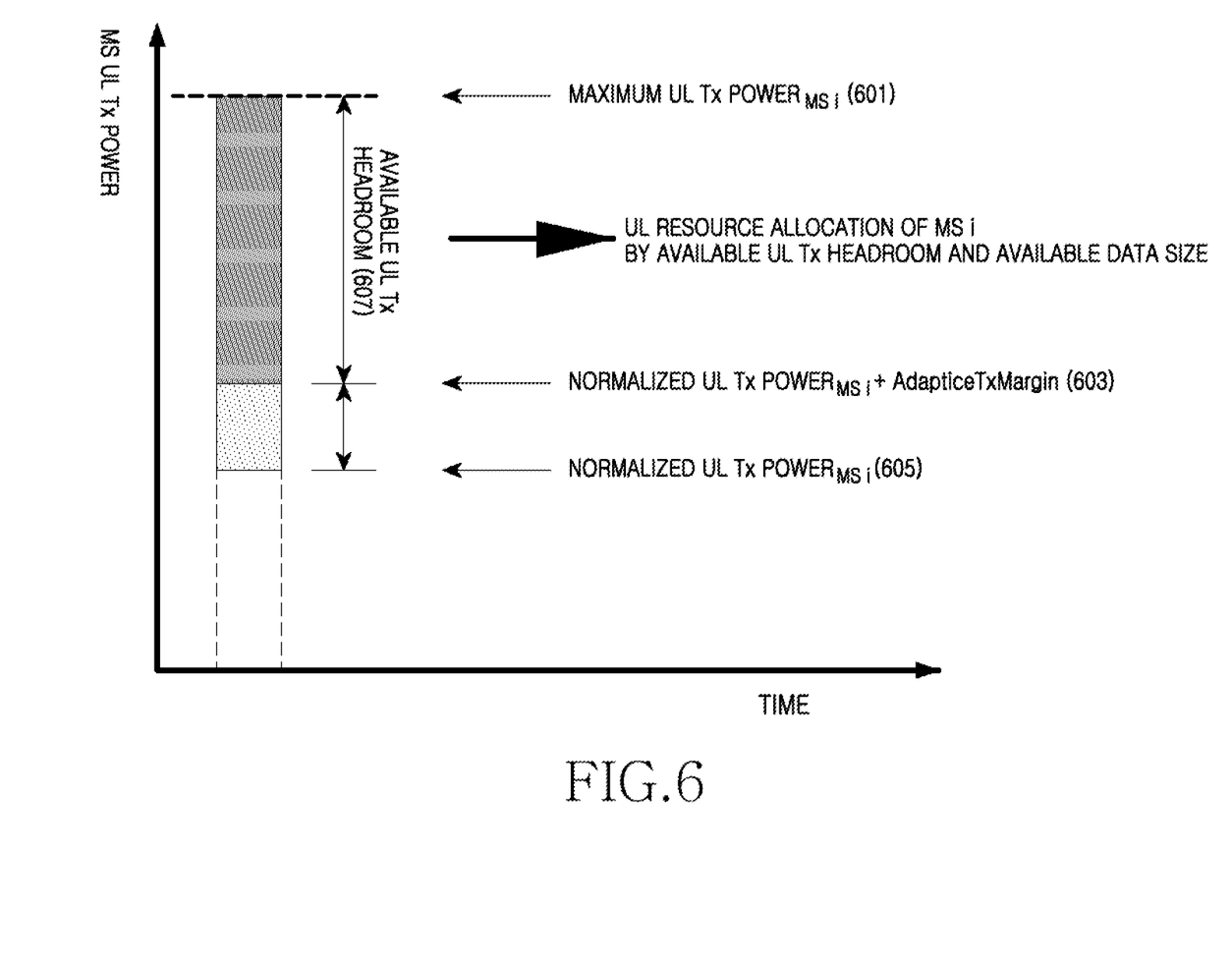
FIG. 6 is a graph illustrating a wireless resource assigning scheme using an available UL headroom of a terminal according to an exemplary embodiment of the present invention.

FIG. 6 is a graph illustrating a wireless resource assigning scheme using an available UL headroom of a terminal according to an exemplary embodiment of the present invention.

Referring to FIG. 6, the base station determines a UL Tx headroom 607 that can be used by the relevant terminal by subtracting a normalized UL Tx power 603 to which AdaptiveTxMargin has been applied (i.e., normalized UL Tx power 605 plus AdaptiveTxMargin), from Maximum UL Tx power 601 that is available to the relevant terminal. In addition, the base station determines a wireless resource (the number of slots) for a data size determined in step 239 or step 241 while the determined UL Tx headroom 607 is not insufficient.

FIG. 3 illustrates a procedure for measuring thermal noise power in a wireless communication system according to an exemplary embodiment of the present invention. More particularly, FIG. 3 illustrates a procedure for measuring thermal noise power using an RSSI in a wireless communication system that does not provide silence duration.

Referring to FIG. 3, a base station determines whether a measured RSSI belongs to a normal range in step 301. When the measured RSSI is determined to be invalid, that is when the measured RSSI is determined not to belong to a normal range, the base station maintains thermal noise power as determined in the past, and restarts a thermal noise power measurement algorithm.

In contrast, when the measured RSSI is determined to be valid (i.e., belong to a normal range), the base station determines a minimum RSSI at a preset interval in step 303. In an exemplary embodiment, the base station determines a minimum RSSI at every 1 minute-duration. In addition, the base station stores an initially determined minimum RSSI in a first memory region M1, stores a minimum RSSI determined during the next 1 minute-duration in a second memory region M2, and continues to perform a storing operation of a minimum RSSI up to a memory region M60 in step 305. When the storing is completed up to the memory region M60, the first memory region M1 is updated by a minimum RSSI calculated during the next 1 minute-duration.

The base station determines a smallest value from among values stored in the memory region M1 to the memory region M60 as a minimum RSSI for a 1 hour-duration every 1 minute in step 307. The base station stores the minimum RSSI determined during the 1 hour-duration in the same memory region, and stores a determined minimum RSSI in the next memory region for the next one hour-duration in step 309.

The base station determines a smallest value from among values stored in a memory region H1 to a memory region H24 as a minimum RSSI for 1 day every 1 minute in step 311. The base station stores the minimum RSSI determined for the 1 day-duration in the same memory region, and stores a determined minimum RSSI in the next memory region for the next 1 day-duration in step 313.

The base station determines the smallest value from among values stored in a memory region D1 to a memory region DN as a minimum RSSI for N days every 1 minute in step 315. The base station determines the minimum RSSI for N days as a thermal noise power No in step 317. As described above, an exemplary embodiment of the present invention determines a minimum value of RSSIs measured for a specific duration as a thermal noise power. The method of FIG. 3 can determine a thermal noise power using a minimum amount of calculations and a minimum memory.

As described above, exemplary embodiments of the present invention can increase system stability and increase quality of a data service by estimating a size of interference given to an external sector, and determine UL data transmission rate (or MCS level) using an interference estimation value given to an external sector and a wireless channel state.

Although the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus of a base station in a wireless communication system, the apparatus comprising:
a measuring unit for measuring an interference factor representing an interference degree caused within a sector served by the base station by signals to an external sector;
an estimation unit for estimating interference caused by signals of the sector served by the base station to the external sector using the interference factor, an interference weight depending on a location of a terminal, and an amount of wireless resource use of a serving sector; and
a scheduler for determining a data transmission rate according to the interference estimated by the estimation unit and a wireless channel state of the terminal,
wherein the external sector comprises a sector served by a neighbor base station different from the base station,
wherein the estimating of the interference caused to the external sector is performed without information of measured interference in the external sector, and
wherein the measuring and estimating are performed independently by the base station without communication with the neighbor base station.

2. The apparatus of claim 1, wherein the measuring unit comprises:

a first calculator for calculating first reception power of a terminal in a serving sector, and second reception power of a terminal in an external sector, using a measured Received Signal Strength Indicator (RSSI), Noise and Interference power (NI), and thermal Noise power (No); and
a second calculator for calculating the interference factor using a ratio of the first reception power and the second reception power.

3. The apparatus of claim 2, wherein the first calculator calculates the first reception power ($P_{InSector}$) and the second reception power ($P_{OtherSector}$) using the equation:

$$P_{InSector} = RSSI - NI$$

$$P_{OtherSector} = NI - No.$$

4. The apparatus of claim 2, wherein the estimation unit comprises:
a third calculator for calculating the interference weight, using UpLink (UL) resource assignment information corresponding to a measured RSSI, and a weight for each Modulation and Coding Scheme (MCS) level; and
a fourth calculator for calculating an interference estimation value comprising a Rise over Thermal (RoT) estimation value, using the interference factor, RoT-related values, and the interference weight.

5. The apparatus of claim 4, wherein the third calculator calculates the interference weight using the equation:

$$InterferenceWeight = \frac{\sum_{MSi} W_{ULMCS,MSi} \cdot ULResource_{MSi}}{TotalSlotNumber},$$

where $W_{UL\_MCS,MSi}$ is the weight corresponding to an MCS level used by an i-th terminal, $ULResource_{MSi}$ is the number of slots assigned to an i-th terminal, and TotalSlotNumber is the number of total slots assigned to terminals.

6. The apparatus of claim 4, wherein the fourth calculator calculates the interference estimation value (RoTEst) using the equation:

$$RoTEst = \frac{AvgInterferenceFactor \cdot P_{InSector} \cdot InterferenceWeight \cdot ULResourceRatio + No}{No}$$

where AvgInterferenceFactor is one of an average value and an instantaneous value of the interference factor, PInSector is the first reception power, InterferenceWeight is the interference weight, and ULResourceRatio is a UL wireless resource ratio.

7. The apparatus of claim 1, wherein the scheduler comprises:
a margin determination unit for comparing the interference estimation value with a preset threshold, and for controlling AdaptiveTxMargin depending on the comparison result;
a first determination unit for determining a first MCS level for each terminal using the controlled AdaptiveTxMargin;
a second determination unit for determining a second MCS level for each terminal using DownLink (DL) channel information of each terminal; and a third determination unit for comparing the first MCS level with the second MCS level and for determining a lower MCS level between them as a UL MCS level of a relevant terminal.

8. The apparatus of claim 7, wherein the first determination unit normalizes UL Tx power received from each terminal using a reference MCS level and a reference unit, adds AdaptiveTxMargin to the normalized Tx power, and compares the added value with a preset reference value to determine the first MCS level.

9. The apparatus of claim 7, wherein the scheduler further comprises:
a fourth determination unit for comparing an average of interference estimation values for a preset duration with a preset threshold, and for determining an available data size for each terminal depending on the comparison result; and
a fifth determination unit for calculating an available Tx headroom for each terminal, and for determining a wireless resource to be assigned using a Tx headroom and an available data size for each terminal.

10. The apparatus of claim 9, wherein the fifth determination unit normalizes UL Tx power received from each terminal using a reference MCS level and a reference unit, and calculates the Tx headroom by subtracting the normalized Tx power, to which AdaptiveTxMargin has been applied, from maximum Tx power of a relevant terminal.

11. A method for assigning a resource at a base station in a wireless communication system, the method comprising:
measuring an interference factor representing an interference degree caused within a sector served by the base station by signals to an external sector;
estimating interference caused by signals of the sector served by the base station to the external sector using the interference factor, an interference weight depending on a location of a terminal, and an amount of wireless resource use of a serving sector; and
determining a data transmission rate according to the estimated interference and a wireless channel state of the terminal,
wherein the external sector comprises a sector served by a neighbor base station different from the base station,
wherein the estimating of the interference caused to the external sector is performed in the base station without information of measured interference in the external sector, and
wherein the measuring and estimating are performed independently by the base station without communication with the neighbor base station.

12. The method of claim 11, wherein the measuring of the interference factor comprises:
calculating first reception power of a terminal in a serving sector, and second reception power of a terminal in an external sector, using a measured Received Signal Strength Indicator (RSSI), Noise and Interference power (NI), and thermal Noise power (No); and
calculating the interference factor using a ratio of the first reception power and the second reception power.

13. The method of claim 12, wherein the first reception power ($P_{InSector}$) and the second reception power ($P_{OtherSector}$) are calculated using the equation:

$$P_{InSector} = RSSI - NI$$

$$P_{OtherSector} = NI - No.$$

14. The method of claim 12, wherein the estimating of the interference given to the external sector comprises:

calculating the interference weight using UpLink (UL) resource assignment information corresponding to a measured RSSI, and a weight for each Modulation and Coding Scheme (MCS) level; and
calculating an interference estimation value comprising a Rise over Thermal (RoT) estimation value using the interference factor, RoT-related values, and the interference weight.

15. The method of claim 14, wherein the interference weight is calculated using the equation:

$$InterferenceWeight = \frac{\sum_{MSi} W_{ULMCS,MSi} \cdot ULResource_{MSi}}{TotalSlotNumber}$$

where $W_{UL\,MCS,MSi}$ is the weight corresponding to an MCS level used by an i-th terminal, $ULResource_{MSi}$ is the number of slots assigned to an i-th terminal, and TotalSlotNumber is the number of total slots assigned to terminals.

16. The method of claim 14, wherein the interference estimation value (RoTEst) is calculated using the equation:

$$RoTEst = \frac{AvgInterferenceFactor \cdot P_{InSector} \cdot InterferenceWeight \cdot ULResourceRatio + No}{No}$$

where AvgInterferenceFactor is one of an average value and an instantaneous value of the interference factor, PInSector is the first reception power, InterferenceWeight is the interference weight, and ULResourceRatio is a UL wireless resource ratio.

17. The method of claim 11, wherein the determining of the data transmission rate comprises:
comparing the interference estimation value with a preset threshold;
controlling AdaptiveTxMargin depending on the comparison result;
determining a first MCS level for each terminal using the controlled AdaptiveTxMargin;
determining a second MCS level for each terminal using DownLink (DL) channel information of each terminal; and
comparing the first MCS level with the second MCS level to determine a lower MCS level between them as an UL MCS level of a relevant terminal.

18. The method of claim 17, wherein the determining of the first MCS level comprises:
normalizing UL Tx power received from each terminal using a reference MCS level and a reference unit;
adding AdaptiveTxMargin to the normalized Tx power; and
comparing the added value with a preset reference value to determine the first MCS level.

19. The method of claim 17, wherein the determining of the data transmission rate comprises:
comparing an average of interference estimation values for a preset duration with a preset threshold;
determining an available data size for each terminal depending on the comparison result;
calculating an available Tx headroom for each terminal; and
determining a wireless resource to be assigned using a Tx headroom and an available data size for each terminal.

20. The method of claim 19, wherein the determining of the wireless resource comprises:

normalizing UL Tx power received from each terminal using a reference MCS level and a reference unit; and     calculating the Tx headroom by subtracting the normalized Tx power, to which AdaptiveTxMargin has been applied, from maximum Tx power of a relevant terminal.

\* \* \* \* \*